United States Patent [19]

Buhayar

[11] 3,827,545

[45] Aug. 6, 1974

[54] METHOD AND APPARATUS FOR CHANGING THE SPACING BETWEEN DISCRETE, FLEXIBLE WEB PRODUCT

[75] Inventor: Eric S. Buhayar, Swathmore, Pa.

[73] Assignee: Scott Paper Company, Delaware County, Pa.

[22] Filed: Dec. 4, 1972

[21] Appl. No.: 311,453

[52] U.S. Cl. .............. 198/34, 271/203, B65g/47/26
[58] Field of Search ........ 198/20 C, 34, 76; 271/76, 271/203, 202; 74/393

[56] References Cited
UNITED STATES PATENTS
2,127,568   8/1938   Novick .................................. 271/76
3,585,874   6/1971   Ingham ................................. 74/393

Primary Examiner—Evon C. Blunk
Assistant Examiner—Douglas D. Watts
Attorney, Agent, or Firm—Martin L. Faigus; William J. Foley

[57] ABSTRACT

Method and apparatus for changing the spacing between discrete, flexible web products employ, in seriatim, an inlet conveyor moving at a first predetermined speed, a speed regulator, and an outlet conveyor moving at a second predetermined speed. The speed regulator moves through a repeating cycle; each cycle including, sequentially, a first constant speed period at which the speed is the same as the inlet conveyor speed, a first changing speed period, a second constant speed period at which the speed is the same as the outlet conveyor speed, and a second changing speed period terminating in the first constant speed period. Discrete web products are directed in a downstream direction at a constant inlet pitch spacing by the inlet conveyor toward the speed regulator. A web product entering the speed regulator initially is gripped simultaneously at its leading end by the speed regulator and at a region upstream from the leading end by the inlet conveyor. The speed regulator is in its first constant speed period matching the speed of the inlet conveyor for at least a part of the time that the web product is simultaneously gripped by the inlet conveyor and speed regulator to assure that transfer of control of the web product from the inlet conveyor to the speed regulator is achieved with the inlet conveyor and speed regulator moving at the same speed. During the time that movement of the web product can be controlled solely by the speed regulator, the speed regulator moves through its first changing speed period into its second constant speed period to correspondingly change the speed of the web product from that of the inlet conveyor to that of the outlet conveyor. The web product is then directed to the outlet conveyor, and initially is gripped simultaneously at its leading end by the outlet conveyor and at a region upstream from the leading end by the speed regulator. The speed regulator is in its second constant speed period matching the speed of the outlet conveyor for at least a part of the time that the web product is simultaneously gripped by the speed regulator and outlet conveyor to assure that transfer of control of the web product from the speed regulator to the outlet conveyor is achieved with the speed regulator and outlet conveyor moving at the same speed. After movement of the web product is solely controlled by the outlet conveyor the speed regulator experiences its second changing speed period and returns to its first constant speed prior to having any effect upon the movement of the next adjacent web product being directed by the inlet conveyor to the speed regulator. The cycle is then repeated. In this manner the outlet pitch spacing of the web products at the outlet conveyor will be greater than the inlet pitch spacing of the web products if the speed of the outlet conveyor is faster than the speed of the inlet conveyor, and the outlet pitch spacing will be less than the inlet pitch spacing if the speed of the outlet conveyor is slower than the speed of the inlet conveyor.

19 Claims, 8 Drawing Figures

--- AVERAGE CONSTANT VELOCITY OF OUTPUT SHAFT
— CYCLIC VELOCITY OF OUTPUT SHAFT

000# METHOD AND APPARATUS FOR CHANGING THE SPACING BETWEEN DISCRETE, FLEXIBLE WEB PRODUCT

BACKGROUND OF THE INVENTION

1. Field of the Invention

This invention relates to method and apparatus for changing the spacing between discrete, flexible web products.

2. Description of the Prior Art

In manufacturing web products, it is often necessary to change the pitch spacing of components in a precisely repeatable manner. For example, in manufacturing disposable diapers it is often required to precisely position absorbent members, such as wadding, on webs which ultimately will form a portion fo the covering envelope for the absorbent members. Such absorbent members can be cut from a continuous web and then precisely spaced to be properly positioned on the webs.

Also, in the formation of disposable diapers, and other assemblages employing web products, it is often necessary to precisely space the products a known distance from each other prior to performing subsequent operations thereon by downstream tooling. For example, after the components of the web products have been assembled together, it may be necessary to turn the web products 90° from their formed direction prior to a folding operation. The initial spacing between the web products may be so close as to prevent this turning action without interference between adjacent web products. Therefore, it will be required to first space the web products apart a predetermined distance prior to the turning operation.

Flexible web products are often manufactured in different sizes. For example, the length of disposable diapers for use by infants is different than the length of disposable diapers for use by toddlers. Often the same operations are performed on the disposable diapers, regardless of size, by tooling spaced at fixed distances apart in an assembly line. In such instances, the pitch spacing between diapers must be normalized, i.e., the spacing between adjacent diapers must be the same, as the diapers are directed to the tooling in the assembly line, regardless of whether the tooling is being utilized in the manufacture of toddler size diapers having one initial pitch spacing, or different size diapers having a different initial pitch spacing. The normalizing of the pitch spacing, as described above, desirably should be achievable with a minimum of machine change.

One prior art approach for changing the spacing between discrete objects has been to directly feed the objects from a first conveyor moving at a first speed directly into engagement with a second conveyor moving at a different speed. If the speed of the second conveyor is greater than that of the first conveyor an increase in spacing will be achieved. If the speed of the second conveyor is slower than that of the first conveyor a decrease in spacing will be achieved. In such spacing devices, some slippage of the objects occurs as they are transferred from the first conveyor to the second conveyor, since a change in product speed cannot take place instantaneously. When it is not necessary to know exactly where the objects are at any subsequent time, the above described technique has been generally satisfactory. However, where a specific time/position relationship has had to be achieved, such as when the products are to be operated on by tooling downstream, it has been necessary to regain control of the objects by some means, such as overtaking them with driven dogs mounted on a fixture chain associated with the second conveyor. For lightweight objects which can withstand this sort of treatment without buckling these techniques have worked. However, flexible web products, such as disposable diapers, have a tendency to buckle under such treatment, and therefore are not desirably handled in the above-described fashion. U.S. Pat. No. 3,142,231, issued to Christensson and U.S. Pat. No. 3,514,099, issued to Miller et al. disclosed apparatus of the above-described type in which objects being advanced at a first constant speed are engaged by a speed regulator moving at a different constant speed to change the spacing between discrete objects.

U.S. Pat. No. 2,546,476, issued to Schefe, relates to a differential conveyor for decelerating steel sheets prior to piling them one upon the other. This differential conveyor employs a set of frictionally driven rolls for positively advancing the discrete steel sheets into a second set of rolls to which a frictional braking action has been applied. This conveyor is effective to decrease the speed of each discrete steel sheet to a predetermined velocity as it leaves said conveyor. However, due to inherent variations in frictional braking action upon the second set of rolls the precise time and position within the conveyor that each discrete sheet will reach its predetermined exit velocity will vary, thereby preventing precise spacing between discrete sheets as they exit from the conveyor. The differential conveyor disclosed in schefe is quite acceptable for use in achieving a terminal exit velocity speed for the discrete steel sheets; however, the arrangement disclosed in Schefe is not acceptable for precisely changing the pitch spacing between discrete objects to permit them to be worked upon by tooling disposed downstream of the differential conveyor and spaced at fixed distances apart.

U.S. Pat. No. 1,837,241, issued to Van Buren and U.S. Pat. No. 2,580,469, issued to Schwartz, relate to speed changing equipment wherein the speed is gradually changed over a finite period of time. In U.S. Pat. No. 2,580,469, opposed rotary cams respectively increase and decrease in radius by corresponding increments with corresponding angular displacements of the cams as their surfaces move in gripping engagement with an object. One of the cams is provided with a higher coefficient of friction surface than the other cam to provide the driving force for the object, and the other cam acts as a back-up to insure that engagement of the object with the driving cam is maintained. In this arrangement the gripping nip defined by the surfaces of the opposed cams incrementally moves away from the plane in which the product is initially fed by inlet conveying rolls. The precise plane in which the objects will be released from the gripping nip of the cams will depend upon the specific configuration of the cams. Since the specific configuation of the cams will change for different speed changing applications, e.g., when objects of different size are to be processed within the speed changing equipment, the plane in which the objects will be released from the dripping nip between the opposed cams will also vary. When the objects are to be worked upon by fixed tooling which is adapted to function in only one plane, the speed changing apparatus disclosed in the Schwartz patent is not acceptable.

U.S. Pat. No. 1,837,241, issued to Van Buren, discloses the matching of velocities of an inlet conveyor and a speed regulator to allegedly ensure transfer of objects from the inlet conveyor to the speed regulator at the same speed. However, the speed regulator continuously varies in velocity through each cycle, i.e., there is no constant speed period in the cycle. Therefore, unless the discrete objects are transferred from the control of the inlet conveyor to the control of the speed regulator precisely at the instant of time the speeds of the inlet conveyor and speed regulator are matched, some slippage of the product relative to the speed regulator may occur. This precise matching of speeds with the exact time an object is gripped by the speed regulator is extremely difficult to achieve, since slight variations in thickness of the objects can cause engagement of the objects with the speed regulator at slightly different locations, and consequently at slightly different time intervals.

U.S. Pat. No. 3,661,282, issued to Buhayar et al. discloses a system for changing the pitch spacing between containers having peripheral flanges which are spaced apart a predetermined distance from each other (FIG. 8). This system employs an inlet conveyor, a speed regulator and an outlet conveyor. The inlet conveyor and speed regulator overlap each other to simultaneously grip the peripheral flange of a container as it is transferred from the inlet conveyor to the speed regulator. Also, the speed regulator and outlet conveyor are in overlapping relationship to simultaneously engage the peripheral flange of a container as it is transferred from the speed regulator to the outlet conveyor. This overlapping arrangement of elements for simultaneously gripping the same transverse region, i.e., peripheral flange, of a container is extremely inflexible. To further explain, employing the overlapping arrangement of elements, as described above, requires a specific construction for the inlet conveyor and the speed regulator for containers having peripheral flanges which are spaced one predetermined distance apart; and a different construction for the inlet conveyor and speed regulator for containers having peripheral flanges which are spaced a different predetermined distance apart. Speed changing equipment requiring such an extensive amount of modification to handle differently spaced products lacks versatility, and is undesirable for the purposes of this invention.

SUMMARY OF THE INVENTION

The method and apparatus of this invention for changing the spacing between discrete, flexible web products, employs, in seriatim, an inlet conveyor, a speed regulator and an outlet conveyor, all of which include product engaging means for positively gripping said web products and moving said web products in a downstream direction. The product engaging means can include a single product engaging surface with a partial vacuum applied therethrough, or opposed, confronting product engaging surfaces defining a gripping nip. Reference throughout this application to the "speed," "movement," "acceleration," etc. of the inlet conveyor, speed regulator and/ or outlet conveyor refers to the motion of the product engaging surface and/or surfaces.

Reference to "web products" throughout this application refers to either single web elements, or assemblages including web elements, and is not intended to be limited to any particular product.

According to this invention, the inlet conveyor is driven at a first constant predetermined speed, the outlet conveyor is driven at a second constant predetermined speed different from said first constant predetermined speed, and the speed regulator is driven through a repeating cycle. Each cycle of the speed regulator includes, sequentially, a first constant speed period wherein the first constant speed is the same as the speed of the inlet conveyor, a first gradually changing speed period, a second constant speed period wherein the second constant speed is the same as the speed of the outlet conveyor, and a second gradually changing speed period terminating in said first constant speed period.

Discrete, flexible web products having a constant inlet pitch spacing (i.e., the spacing between leading edges of adjacent web products) are gripped by the product engaging means of the inlet conveyor and moved in a downstream direction toward the speed regulator. The web product entering the speed regulator initially is gripped simulataneously at its leading end by the product engaging means of the speed regulator, and at a region upstream from the leading end by the product engaging means of the inlet conveyor. The speed regulator is in its first constant speed period matching the speed of the inlet conveyor for at least a part of the time that the web product is simultaneously gripped by the inlet conveyor and speed regulator to assure that transfer of control of the web product from the inlet conveyor to the speed regulator is achieved with the inlet conveyor and speed regulator moving at the same speed. When the movement of the web product can be controlled solely by the product engaging means of the speed regulator, the speed regulator moves through its first changing speed period into its second constant speed period to correspondingly change the speed of the web product from that of the inlet conveyor to that of the outlet conveyor. The web product is then directed to the outlet conveyor, and initially is gripped simultaneously at its leading end by the outlet conveyor and at a region upstream from the leading end by the speed regulator. The speed regulator is in its second constant speed period for at least a part of the time that the web product is simultaneously gripped by the speed regulator and outlet conveyor to assure that transfer of control of the web product from the speed regulator to the outlet conveyor is achieved with the speed regulator and outlet conveyor moving at the same speeds. After the web is completely under the control of the product engaging means of the outlet conveyor, the speed regulator experiences its second changing speed period and returns to the first constant speed prior to having an effect upon the movement of the next adjacent web product being directed by the inlet conveyor to the speed regulator. The above described cycle is then repeated with the next adjacent web product.

According to the above-described process, the discrete, flexible web products are directed to the outlet conveyor with an outlet pitch spacing different from that of the inlet pitch spacing. If the speed of the inlet conveyor is slower than the speed of the outlet conveyor, the first gradually changing speed period will be an increasing speed period, and the pitch spacing between adjacent web products at the outlet conveyor will be greater than the pitch spacing between adjacent web products at the inlet conveyor. If the speed of the inlet conveyor is faster than the speed of the outlet conveyor, the first gradually changing speed period will be a decreasing speed period, and the pitch spacing between adjacent web products at the outlet conveyor will be less than the pitch spacing between adjacent web products at the inlet conveyor.

According to this invention, the inlet conveyor and speed regulator move at the same speed as control of the web products is transferred from the inlet conveyor to the speed regulator. Likewise, the outlet conveyor and speed regulator move at the same speed as control of the web product is transferred from the speed regulator to the outlet conveyor. In this manner, positive, controlled transfer of each web product from the inlet conveyor to the speed regulator, and from the speed regulator to the outlet conveyor is achieved.

Moreover, the speed of each web product is changed in a predetermined gradual manner during the first gradually changing speed period of the speed regulator, during which period the movement of the web product is controlled solely by the movement of said speed regulator. In this manner, instantaneous speed changes are elimianted to thereby prevent uncontrolled slippage of each web product as it is being accelerated or decelerated.

Other objects and advantages of this invention will become apparent upon reading the detailed description which follows, taken in conjunction with the drawings, in which:

DESCRIPTION OF THE PREFERRED EMBODIMENTS OF THE INVENTION

Figure 1:
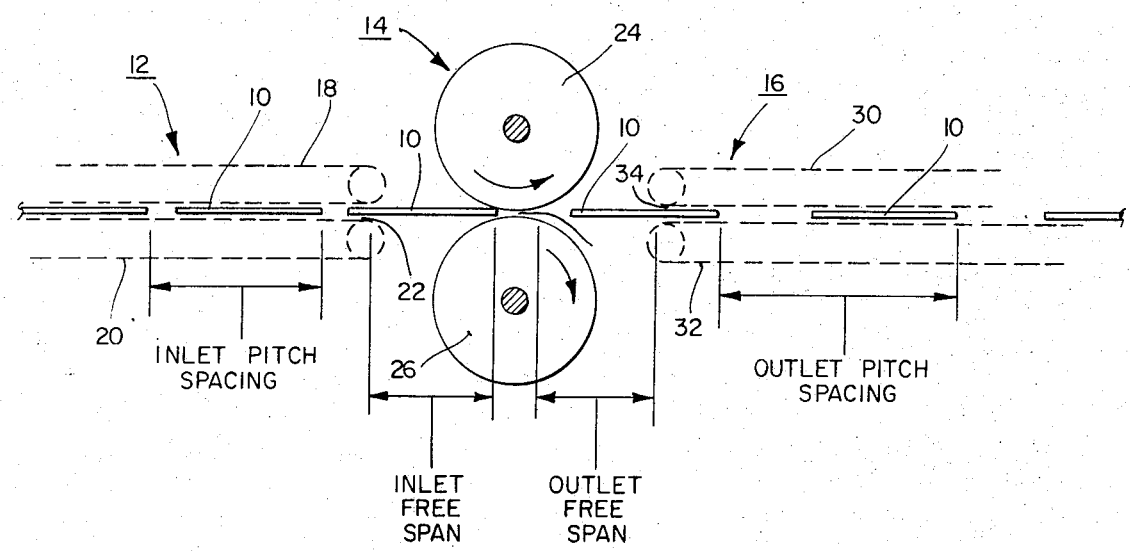
FIG. 1 is a schematic, side elevation view of an apparatus employed in one preferred embodiment of this invention.
Figure 2:
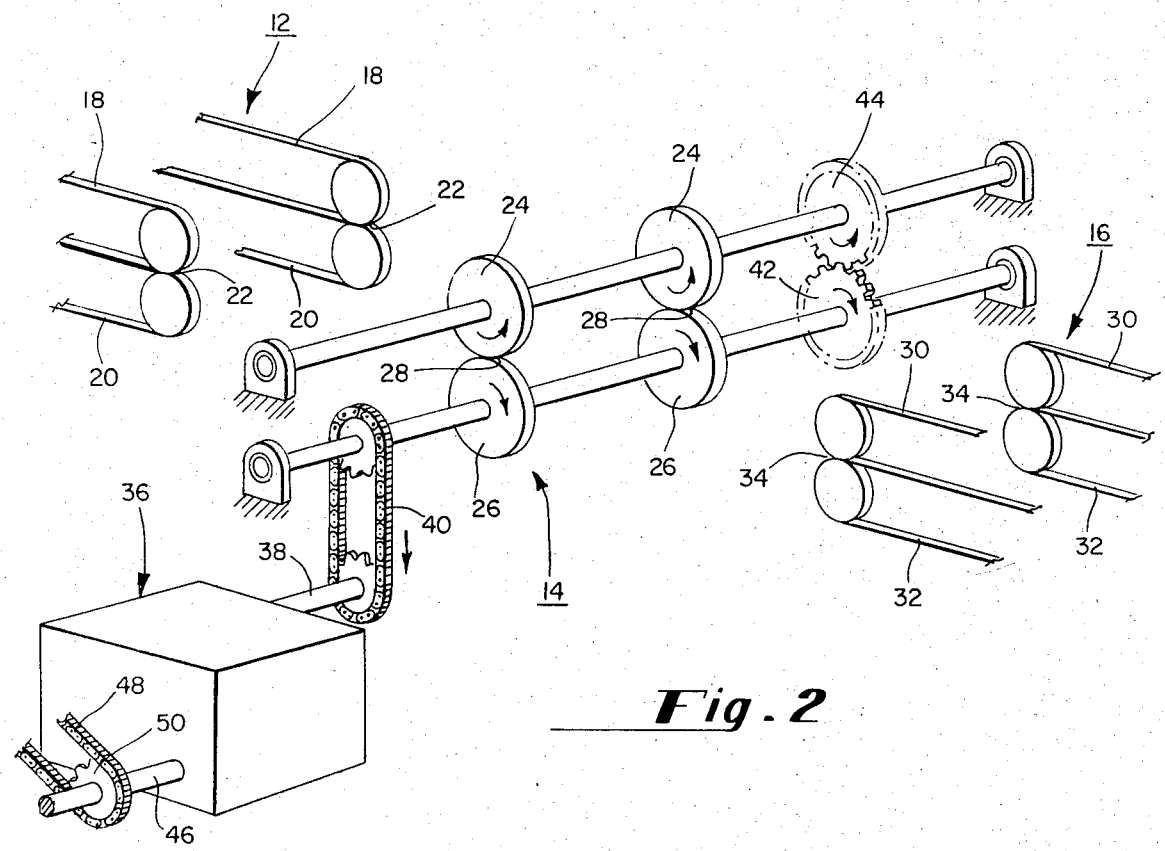
FIG. 2 is a schematic isometric view of the apparatus of FIG. 1.

Referring to FIGS. 1 and 2, a method and apparatus of this invention for changing the pitch spacing between discrete, flexible web products 10 employ, in seriatim, an inlet conveyor 12, a speed regulator 14 and an outlet conveyor 16. The inlet conveyor 12 can include any suitable product engaging means for providing positive controlled feed of the discrete, flexible web product 10. For example, the product engaging means can include a single product engaging support surface of a belt or roll with a partial vacuum applied therethrough. Alternatively, the product engaging means can include opposed, confronting product engaging surfaces of belts or rolls for defining a product gripping nip.

Often it is undesirable to engage the discrete, flexible web products 10 in the medial region thereof by a gripping nip. For example, when the web products 10 are throw-away diapers having a high bulk, absorbent layer in the medial region thereof, engagement of the diaper in this medial region by opposed surfaces can cause an undesirable flattening, or compaction of the product.

FIG. 2 illustrates the construction of an inlet conveyor 12 which is specifically adapted for providing positive controlled feed of the web products 10 without engaging and compacting the medial region thereof. The inlet conveyor 12 shown in FIG. 2 includes transversely spaced upper driven belts 18 which cooperate with transversely spaced lower driven belts 20 to define product gripping nips 22 therebetween for gripping opposed major surfaces of each web product 10 adjacent the machine-direction side margins thereof.

The speed regulator 14 can include any of the variations of product engaging means described above in connection with the inlet conveyor 12. When compaction of the medial region of the web products 10 is not desired, the arrangement shown in FIG. 2 is preferred. This arrangement includes transversely spaced upper rolls 24 which cooperate with transversely spaced lower rolls 26 to define speed modulating gripping nips 28 therebetween.

The outlet conveyor 16 can include the same variations in product engaging means described above in connection with the inlet conveyor 12. When compaction of the medial region of the web products 10 is undesirable, the outlet conveyor 16 can have the construction shown in FIG. 2. Specifically, the outlet conveyor 16 shown in FIG. 2 includes transversely spaced upper driven belts 30 which cooperate with transversely spaced lower driven belts 32 to define outlet conveyor nips 34 for gripping opposed major surfaces of each web product 10 adjacent the machine-direction side margins thereof.

Referring to FIG. 1, an inlet free-span exists between the inlet conveyor 12 and the speed regulator 14, and an outlet free-span exists between the speed regulator 14 and the outlet conveyor 16. The "inlet free-span" is the distance from the last point of engagement of the product engaging means of the inlet conveyor 12 with the trailing end of a discrete web product 10 to the initial point of engagement of the product engaging means of the speed regulator 14 with a leading end of said discrete web product 10. The "outlet free-span" is the distance from the last point of engagement of the product engaging means of the speed regulator 14 with the trailing end of a discrete web product 10 to the initial point of engagement of the product engaging means of the outlet conveyor 16 with the leading end of said discrete web product.

In a preferred method of this invention for increasing the pitch spacing between discrete web products 10 from the inlet conveyor 12 to the outlet conveyor 16 substantially the same frictional gripping force is applied to each web product 10 by the inlet conveyor, speed regulator and outlet conveyor. This is achieved by employing the same web gripping means (i.e., gripping nips) in the inlet conveyor, speed regulator and outlet conveyor (FIGS. 1 and 2).

Figure 3A:
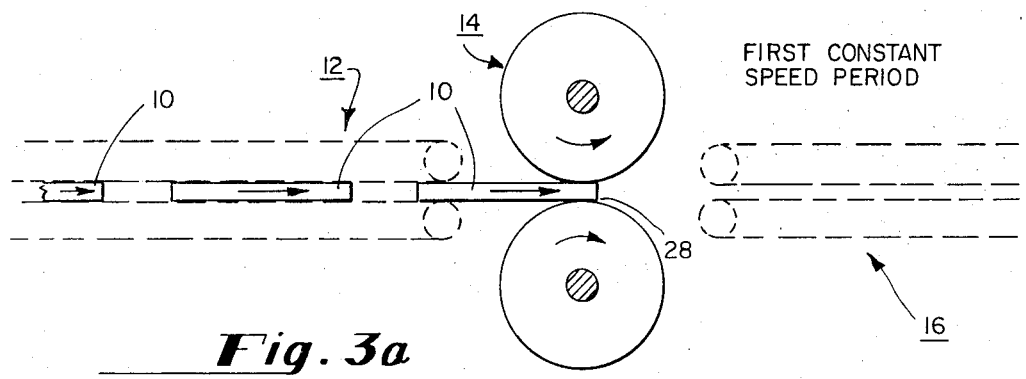
FIGS. 3a–3d show the sequential steps employed according to one preferred method of this invention.
Figure 3B:
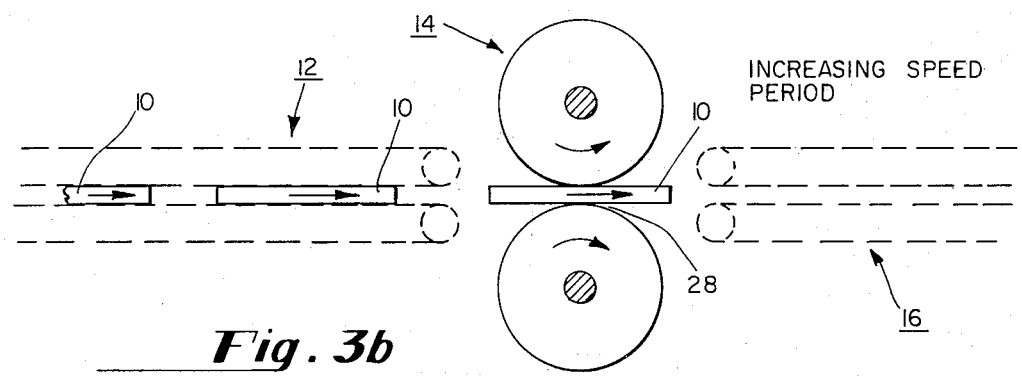
Figure 3C:
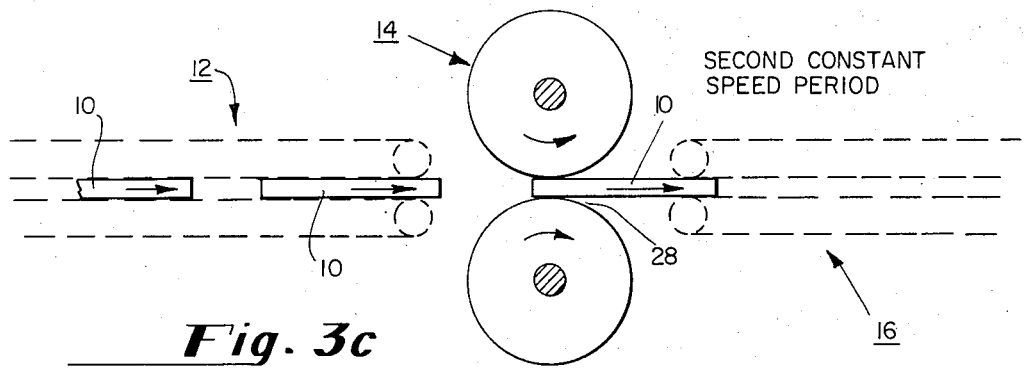
Figure 3D:
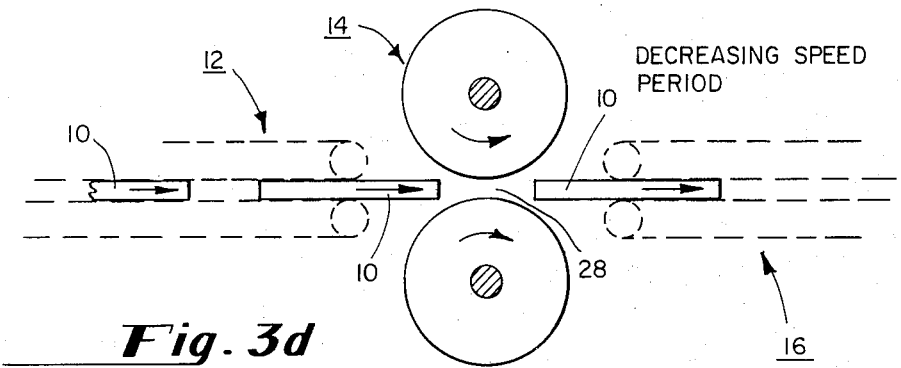

Referring to FIGS. 1 and 3a–3d, the preferred method of this invention described in the preceeding paragraph employs an inlet conveyor 12 driven at a first predetermined constant speed and an outlet conveyor 16 driven at a second predetermined constant speed which is faster than the speed of the inlet conveyor. The speed regulator 14 is driven through a repeating cycle; each cycle including sequentially, a first constant speed period at which its speed is the same as the speed of the inlet conveyor, a gradually increasing speed period, a second constant speed period at which its speed is the same as the speed of the outlet conveyor and a gradually decreasing speed period ending in said first constant speed period. Discrete, flexible web products 10 having a constant inlet pitch spacing are directed serially from the inlet conveyor 12 into the speed modulating nips 28 of the speed regulator 14. During a portion of the first constant speed period of the speed regulator 14, a discrete, flexible web product 10 entering the speed regulator 14 is simultaneously gripped at its leading end by the speed modulating nips 28 of the speed regulator, and at its trailing end by the gripping nips 22 of the inlet conveyor 12. During this period of simultaneous gripping of the discrete web product 10 the speed regulator 14 and the inlet conveyor 12 are driven at the same speed to provide a positive controlled transfer of the web product 10 from the inlet conveyor to the speed regulator (FIG. 3a). After a discrete web product 10 is released from the inlet conveyor 12, and engaged solely by the speed modulating nips 28 of the speed regulator 14, the speed regulator is gradually increased in speed, and enters its second constant speed period to create a corresponding increase in speed of the web product 10 disposed within said speed modulating nips 28 (FIG. 3b). After the speed regulator 14 enters the second constant speed period, at which its speed is the same as the speed of the outlet conveyor 16, the leading end of the discrete web product is directed into gripping engagement with the nips 34 of the outlet conveyor, and the trailing end of the web product is simultaneously maintained in engagement with the speed modulating nips 28 of the speed regulator 14 (FIG. 3c). After the trailing end of the web product is released from the downstream end of the speed modulating nips 28, the speed regulator experiences a decrease in speed back to the first constant speed prior to the next adjacent web product 10 disposed in the inlet conveyor 12 being directed into the speed modulating nips 28 (FIGS. 3d). The above described cycle is then repeated. In this manner, the discrete web products 10 are directed from the inlet conveyor 12 at a first constant inlet pitch spacing to the outlet conveyor 16 at a pitch spacing which is greater than the inlet pitch spacing.

The method of this invention can also be employed to decrease the pitch spacing between discrete, flexible web products 10. To decrease the pitch spacing, the outlet conveyor 16 is driven at a slower speed than the inlet conveyor 12, and the speed regulator 14 is driven through a repeating cycle in which the first constant speed period matches the speed of the inlet conveyor, the second constant speed period matches the speed of the outlet conveyor and the first gradually changing speed period is a decreasing speed period.

When the product engaging means of the inlet conveyor 12, speed regulator 14 and outlet conveyor 16 are not designed so that one or more can be completely overridden, i.e., when said product engaging means grip the web products 10 with substantially the same frictional force, the lengths of the inlet free span and outlet free span are critical to this invention. Specifically there is a minimum allowable inlet free-span and minimum allowable outlet free-span which are related to the product length, the inlet pitch spacing of the product, the nip length defined by the opposed upper rolls 24 and lower rolls 26 of the speed regulator 14, the outlet pitch spacing and the motion program of the speed regulator during the first and second changing speed periods. The minimum allowable inlet free-span and minimum allowable outlet free-span are the minimum spacings which will permit the speed regulator 14 to solely grip only one web product 10 as said speed regulator moves through its first changing speed period, to release said web product during the second constant speed period, and to return to the first constant speed period prior to engaging the next adjacent web product. The inlet free-span and outlet free-span can exceed the minimum allowable span lengths provided that they are not of a length greater than the machine-direction length of the direte, flexible web products 10. In this manner each web product 10 will be gripped simultaneously by the inlet conveyor and speed regulator during transfer to the speed regulator, and simultaneously by the outlet conveyor and speed regulator during transfer to the outlet conveyor.

The speed modulating nip length referred to earlier in this application is the distance between the first point of engagement of the leading end of a web product 10 by the modulating nips 28 and the last point of engagement of the trailing end of said web product by said speed modulating nips, as measured in the machine-direction. In the course of changing the spacing between a plurality of discrete, flexible web products 10 this modulating nip length can vary slightly from product to product. This variation in modulating nip length results from slight variations in thickness of the web products which are inherent in the method of manufacturing such web products. These slight variations in thickness cause the speed regulator 14 to engage the web products 10 and release the web products 10 at slightly different locations, and consequently at slightly different time intervals. These slight variations in thickness from product to product also cause slight variations in the location and time at which the inlet conveyor 12 will completely release a particular web product 10 and at which the outlet conveyor 16 will initially positively grip said web product 10. The inlet free-span and outlet free-span are properly chosen to take into account these slight variations to assure that the mode of operation described above for changing the spacing between the discrete, flexible web product 10 is always achieved.

Figure 4:
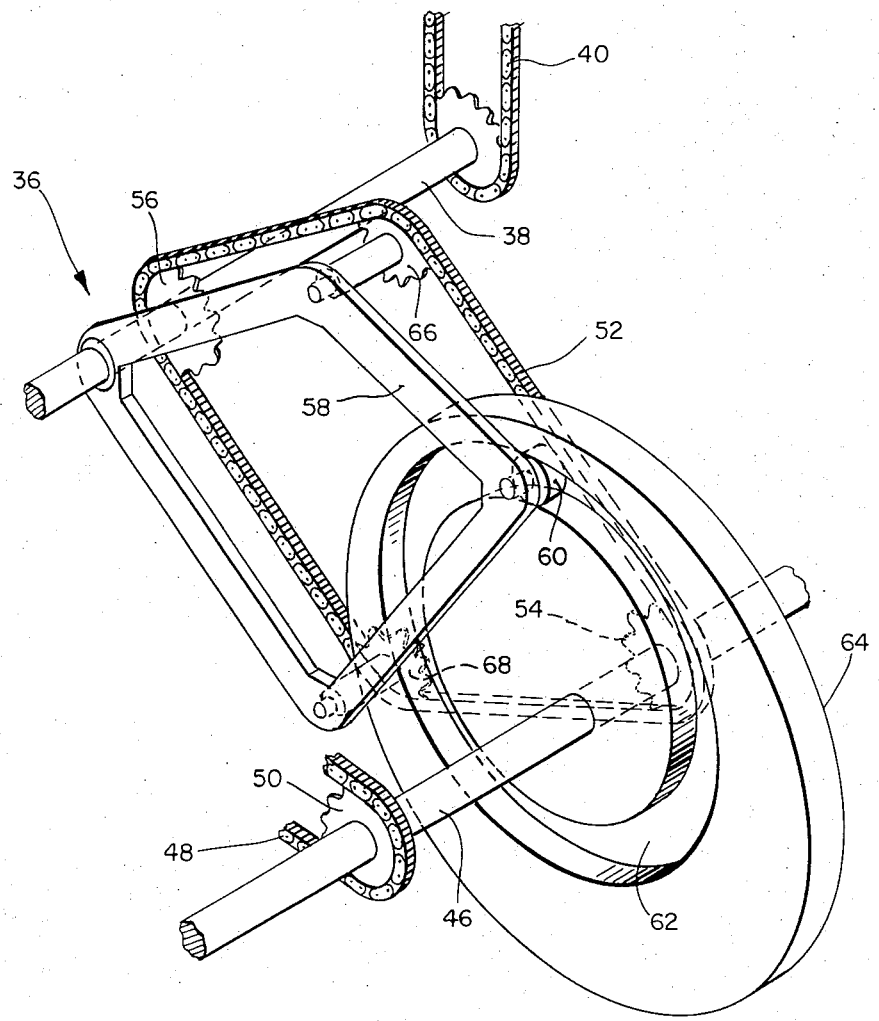
FIG. 4 is an isometric view of a modulating drive employed in a preferred embodiment of this invention.

Referring to FIGS. 2 and 4, the speed regulator 14 includes a modulating drive assembly 36 which positively drives the lower roll pair 26 of the speed regulator through an output shaft 38 and chain connection 40. The upper roll pair 24 of the speed regulator is positively driven at the same speed as the lower roll pair through meshing gears 42 and 44. Preferably the upper pair of rolls 24 and the lower pair of rolls 26 have the same diameters, and the meshing gears 42 and 44 have a 1:1 gear ratio. An input shaft 46 of the modulating drive assembly 36 is driven at a constant speed by any suitable means, such as a motor (not shown) connected to the input shaft through a drive chain 48 and sprocket 50. Alternatively, the input shaft 46 can be driven by drive connections from other driven parts of the equipment.

Turning now to FIG. 4, a preferred modulating drive assembly 36 will be described; however, other modulating drive assemblies, such as barrel cam drives, variable-length chain run devices and the like can be employed in this invention. The input shaft 46, which is driven at a constant speed, as explained above, drives the output shaft 38 through an endless drive-chain 52. Other connections, such as an endless timing belt, can be employed in place of the drive-chain 52. The drive-chain 52 is trained about sprockets 54 and 56 which are fixed to the input shaft 46 and the output shaft 38, respectively. A swing frame 58 is rotationally mounted on the output shaft 38 to permit oscillating motion of the swing frame about said output shaft. A cam follower 60 is secured to the swing frame and rides in a cam groove 62 of a speed modulating cam 64 which is fixedly secured to the input shaft 46. Chain run modifying idler sprockets 66 and 68 are rotationally mounted to the swing frame 58, and are wrapped by the endless drive chain 52.

The dimensions of the various elements of the modulating drive assembly 36 and the spatial relationship among such elements are so chosen that the drive chain 52 remains substantially equally taut as the swing frame 58 is oscillated through its entire oscillational path of travel. Further details of construction of the modulating drive assembly 36 are set forth in a 1968 printed publication of The American Society of Mechanical Engineers, entitled "Optimal Proportioning of Output-Modulating Belt Drive" by Eric S. Buhayar. The subject matter of this publication is hereby incorporated by reference.

The swing frame 58 has a precisely controlled pattern of motion determined by the configuration of the cam groove 62. This pattern of motion is imposed upon the drive chain 52 through the idler sprockets 66 and 68, and cooperates with the velocity imparted to the drive chain through sprocket 54 to provide the desired repeating cyclic motion of the output shaft 38. As explained above, the motion of the output shaft 38 is transmitted to the rolls 24 and 26 of the speed regulator through drive chain 40 and meshing gears 42 and 44.

Figure 5:
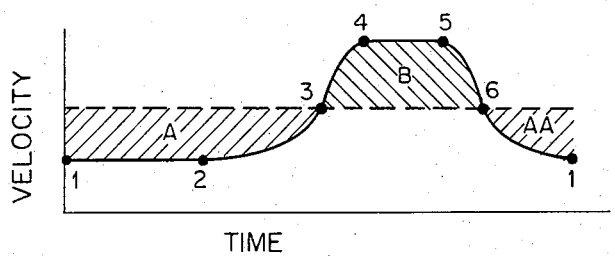
FIG. 5 is a graphic representation of the speed regulator cycle established according to one preferred method of this invention.

Referring to FIG. 5, the operation of the modulating drive assembly 36 will be described for its mode of operation in increasing the pitch spacing between discrete web products 10, as described earlier. The average constant velocity of the output shaft 38 is shown in dash (—) line representation, and represents the velocity imparted to the output shaft 38 through the sprocket 54 and the drive chain 52 when the swing frame 58 is stationary. The swing frame is oscillated through a precisely controlled pattern of motion determined by the configuration of the cam groove 62 to establish the repeating cycle shown in solid line representation in FIG. 4. This repeating cycle includes:

a. A first constant speed period (1 to 2);
  b. A gradually increasing speed period (2 to 4);
  c. A second constant speed period (4 to 5); and in said first constant speed period (5 to 1).

The portion of each repeating cycle from 1 to 3 is achieved by oscillational displacement of the swing frame in one direction. Movement of the swing frame in this same direction is also responsible for the portion of each repeating cycle from 6 to 1. The portion of each cycle between 3 and 6 is achieved by oscillatory displacement of the swing frame in the opposite direction from that which creates the repeating cycle from 1 to 3 and from 6 to 1. The velocity indicated at 3 and 6 is the velocity of the output shaft at the instant of time that the swing frame reaches the end of its excursion in one direction and changes direction. At this instant of time the swing frame is stationary and the velocity of the output shaft is the average velocity, as described above. It is critical to the operation of the modulating drive assembly 36 that the oscillatory displacement of the swing frame 58 in one direction be equal to the oscillatory displacement of the swing frame in its opposite direction to assure that movement of the swing frame from one remote end of its oscillational path to the other remote end of its oscillational path always takes place between fixed positions. This critical feature is represented in the velocity-time graph shown in FIG. 5 by the following geometric relationship:

$$\text{AREA } A + \text{Area } AA = \text{Area } B.$$

The apparatus and method of this invention, as described above in connection with the specific embodiments shown in the drawings, is extremely versatile. To illustrate, disposable diapers for use by infants having a length of approximately 10 inches, and a constant inlet pitch spacing of 10.35 inches were normalized to an outlet pitch spacing of 24 inches. By changing only the speed of the inlet conveyor, the rolls of the speed regulator 14 and the cam 64, the same apparatus was utilized to provide an outlet pitch spacing of 24 inches between disposable diapers for use by toddlers having a length of 15 inches and a constant inlet pitch spacing of 15.52 inches. The same inlet free-span and outlet free-span were suitable for both the infant diapers and the toddler diapers. The following chart indicates the parameters involved in increasing the pitch spacing between infant diapers and toddler diapers to 24 inches, as described above:

|  | Infant Diaper | | Toddler Diaper | |
| --- | --- | --- | --- | --- |
| KNOWN SPECIFICATIONS | | | | |
| Product Length (in.) | 10.00 | | 15.00 | |
| Inlet Pitch Spacing (in.) | 10.35 | | 15.52 | |
| Outlet Pitch Spacing (in.) | 24.00 | | 24.00 | |
| Speed Regulator Gripping Nip Length — estimated (in.) | 0.62 | | 0.62 | |
| DERIVED SPECIFICATIONS | | | | |
| Motion Program | Time(°)$^1$ | Travel(″)$^2$ | Time(°)$^1$ | Travel(″)$^2$ |
| Inlet Constant Velocity | 87.35 | 2.51 | 140.06 | 6.04 |
| Accelerating | 117.50 | 5.60 | 64.69 | 3.55 |

|  | Infant Diaper |  | Toddler Diaper |  |  |
|---|---|---|---|---|---|
| Outlet Constant Velocity | 37.65 | 2.51 | 90.56 | 6.04 |  |
| Decelerating | 117.50 | 5.60 | 64.69 | 3 | .55 |
| TOTALS | 360.00 | 16.22 | 360.00 | 19.18 |  |

¹(°) — degrees of rotation of input shaft of speed regulator
²(″) — inches traveled by surface of speed regulator rolls

|  | Infant Diaper | Toddler Diaper |
|---|---|---|
| Peak Acceleration of Speed Regulator (inches/(cycle time) squared) | 53.50 | 60.37 |
| Minimum Inlet & Outlet Free Spans (in.) | 7.49 | 8.96 |
| Circumference of Speed Regulator Rolls at one revolution/product cycle | 16.22 | 19.18 |
| ADOPTED DESIGN |  |  |
| Actual Inlet and Outlet Free Spans (in.) | 9.19 | 9.19 |
| Circumference of Speed Regulator Rolls (in.) | 16.22 | 19.18 |

Referring to the above chart, the known specifications for designing the equipment of this invention are: product length, inlet pitch spacing, outlet pitch spacing and speed regulator gripping nip length. The gripping nip length is an estimated value, since the precise point at which the products are initially engaged by the gripping nip and released from the gripping nip will vary because of variations in thickness of the diapers. However, the gripping nip length can be estimated with the required degree of accuracy to properly design the equipment.

The motion program can be derived from the known specifications by the utilization of a computer program. The computer program takes into account the design parameters hereinafter enumerated. Both the inlet minimum free-span and outlet minimum free-span are designed to be of the same length. Hence, the length of product travel while simultaneously being gripped by the inlet conveyor and speed regulator is the same as the length of product travel while it is simultaneously gripped by the speed regulator and outlet conveyor. These conditions imply that once the minimum free span is known, the times spent at constant velocity matching the inlet conveyor and at constant velocity matching the outlet conveyor follow.

The motion program for deceleration is designed to be the mirror image of that for acceleration. Therefore, the peak acceleration during the accelerating speed period was the same magnitude as the peak deceleration during the decelerating speed period. The motion of the speed regulator between the two constant speed periods is according to a single-lobe, sine-modified trapezoidal acceleration diagram with the rise to peak acceleration taking 30 percent of the time and the fall from peak acceleration taking another 30 percent of the time, thereby leaving 40 percent of the time during the acceleration speed period at peak acceleration. The distance traveled by the surface of the speed regulator rolls during the acceleration and deceleration periods is calculated to be in the same as that traveled by a diaper from the instant its trailing end is free of the inlet conveyor until the leading end is initially engaged by the outlet conveyor, and under the condition that the inlet free-span and outlet free-span are both at their minimum values. Stating this another way, the distance traveled by the surfaces of the speed regulator rolls is determined according to the following equation:

Minimum inlet free span + gripping nip length + minimum outlet free span − product length = distance traveled by surfaces of speed regulator rolls while changing speeds.

Once the motion program for the speed regulator is determined, the minimum free span is easily calculated by subtracting the distance traveled by the surfaces of the speed regulator rolls during the first constant speed period from the length of the product.

The actual inlet and outlet free spans adopted for use are both the same, and are both greater than the minimum free spans and less than the product length. In this manner, the first changing speed period will always take place with only one discrete product under the sole control of the speed regulator and the second changing speed period will take place without affecting the movement of adjacent web products. Also, each web product will be simultaneously gripped by the speed regulator and inlet conveyor as it is being transferred to the speed regulator, and simultaneously gripped by the speed regulator and outlet conveyor as it is being transferred to the outlet conveyor. The distance traveled by the web products as they are simultaneously gripped is more than adequate to provide for variability and uncertainty concerning the exact time and position of each gripping and/or release of the products.

The above described parameters are intended to be illustrative of a preferred embodiment of this invention and are not intended to be limiting on the broadest aspects of the invention. For example, the inlet free span and outlet free span do not have to be of the same length. Moreover, the acceleration and deceleration periods do not have to be according to a single-lobe sine-modified trapezoidal acceleration diagram, as described above. However, such preferred acceleration and deceleration profiles alleviate undue stresses upon the equipment.

It is critical to this invention that the speed regulator and inlet conveyor move at the same speed for at least a part of the time that they simultaneously grip a web product to insure that positive control of the web product is maintained as it is transferred from the inlet conveyor to the speed regulator. The exact time period during which the speed regulator and inlet conveyor must move at the same speed to insure positive controlled transfer depends upon the relationship between the frictional gripping force applied to the web product by said speed regulator and said inlet conveyor. If the frictional gripping force applied by the speed regulator exceeds the frictional gripping force applied by the inlet conveyor by an amount sufficient to completely override the effect of the inlet conveyor upon web product movement, the speed of the speed regulator must be the same as that of the inlet conveyor from a time just prior to the leading end of a web product becoming engaged by the speed regulator to a time when the web product is positively gripped by the speed regulator. In this manner, the web product is transferred from the control of the inlet conveyor to the control of the speed regulator while the speed regulator and inlet conveyor are moving at the same speed to thereby prevent slippage of the web product relative to the speed regulator. When the speed regulator can completely override the effect of the inlet conveyor upon web product movement, the inlet conveyor can be moved closely adjacent to the speed regulator without any regard to a calculated inlet free-span. This is possible because the speed regulator will be able to positively drag the web product over the surface of the inlet conveyor while the web product is experiencing a gripping force applied by the inlet conveyor without causing any slippage of the web product in the speed regulator.

If the frictional gripping force applied by the inlet conveyor exceeds the frictional gripping force applied by the speed regulator by an amount sufficient to completely override the effect of the speed regulator upon web movement, the speed of the speed regulator must be the same as that of the inlet conveyor from a time just prior to the trailing end of a web product being released from the inlet conveyor to a time when the trailing end of the web product is completely released from the inlet conveyor. Under such conditions, the web product will be transferred from the control of the inlet conveyor to the control of the speed regulator while the inlet conveyor and speed regulator are moving at the same speed, thereby preventing any slippage of the web product relative to the speed regulator. In addition, the inlet conveyor can be moved closely adjacent to the speed regulator without any regard to a calculated inlet free-span, since the speed regulator will slip relative to the web product without causing any slippage of the web product while it is gripped by the inlet conveyor.

If the frictional gripping force applied by the speed regulator is substantially the same as the frictional gripping force applied by the inlet conveyor, both the speed regulator and the inlet conveyor will have an effect upon the movement of the web product during the entire time period in which they simultaneously grip the web product. Stating this another way, neither the speed regulator nor the inlet conveyor will completely override the effect the other has upon web movement. In this latter situation, the speed of the speed regulator must be the same as the speed of the inlet conveyor from a time just prior to the leading end of a web product becoming engaged by the speed regulator to a time just after the trailing end of the web product is released by the inlet conveyor. This situation was described in detail in connection with the preferred embodiment of this invention shown in the drawings.

It is critical to this invention that the speed regulator and outlet conveyor move at the same speed for at least a part of the time that they simultaneously grip a web product to assure that positive control of the web product is maintained during transfer from the speed regulator to the outlet conveyor. The exact time period during which the speed regulator and outlet conveyor must move at the same speed to assure that positive controlled transfer of the web product from the speed regulator to the outlet conveyor is achieved, depends upon the relationship between the frictional gripping force applied to the web product by said speed regulator and said outlet conveyor.

If the outlet conveyor can completely override the effect upon web movement of the speed regulator, the speed of the speed regulator must be the same as the speed of the outlet conveyor from a time just prior to the leading end of the web product becoming gripped by the outlet conveyor to a time when the web product is positively gripped by said outlet conveyor.

If the speed regulator can completely override the effect upon web movement of the outlet conveyor, the speed of the speed regulator must be the same as the speed of the outlet conveyor from a time just prior to the trailing end of the web product being released from the speed regulator to a time when the trailing end is completely released by the speed regulator.

When either the speed regulator or outlet conveyor is capable of completely overriding the effect upon web movement of the other, the outlet conveyor can be moved closely adjacent to the speed regulator without any regard to a calculated outlet free-span, for substantially the same reasons explained above in connection with the relationship between the inlet conveyor and the speed regulator.

If neither the speed regulator nor the outlet conveyor can completely override the other when simultaneously gripping a web product, the speed of the speed regulator must be the same as the speed of the outlet conveyor from a time just prior to the leading end of the web product becoming engaged by the outlet conveyor to a time when the trailing end of the web product is completely released from the speed regulator. In this situation it is critical that the calculated outlet free-span be taken into account in designing the equipment to effect the mode of operation described in connection with the preferred embodiment of this invention shown in the drawings.

What is claimed is:

1. A method for changing the spacing between discrete, flexible web products by directing said web products, in seriatim, past an inlet conveyor, speed regulator and outlet conveyor; said method comprising the steps of:

A. gripping said discrete web products by said inlet conveyor and feeding them in a downstream direction to said speed regulator at a first predetermined speed and at a constant pitch spacing;

B. gripping the web product entering the speed regulator simultaneously at its leading end by the speed regulator, and at a region upstream from the leading end by the inlet conveyor;

C. moving the speed regulator and inlet conveyor at the same speed for at least a part of the time that the web product is simultaneously gripped for assuring that the web product is transferred from the control of the inlet conveyor to the control of the speed regulator while the inlet conveyor and speed regulator are moving at the same speed;

D. gradually changing the speed of the speed regulator to a second predetermined speed different from that of the inlet conveyor while movement of the web product is controlled solely by the speed regulator to thereby change the speed of said web product to the second predetermined speed;

E. driving the outlet conveyor at said second predetermined speed;

F. simultaneously gripping said web product at its leading end by the outlet conveyor, and at a region upstream from the leading end by the speed regulator;

G. moving the speed regulator and outlet conveyor at the same second predetermined speed for at least a part of the time that the web product is simultaneously gripped for assuring that the web product is transferred from the control of the speed regulator to the control of the outlet conveyor while the speed regulator and outlet conveyor are moving at the same speed;

H. changing the speed of said speed regulator from said second predetermined speed to said first predetermined speed after movement of the web product is solely controlled by the outlet conveyor and before movement of the next adjacent web product is influenced by the speed regulator; and I. repeating steps B through H with said next adjacent web product, to thereby change the spacing between adjacent discrete, flexible web products to a second predetermined pitch spacing at said outlet conveyor.

2. The method according to claim 1, including gripping opposed major surfaces of the flexible web products by confronting gripping surfaces of said speed regulator.

3. The method according to claim 2, including gripping the flexible web products adjacent side margins thereof by the inlet conveyor, speed regulator and outlet conveyor.

4. The method according to claim 2, wherein said second predetermined speed is faster than said first predetermined speed to increase the pitch spacing between the web products.

5. The method according to claim 2, wherein said second predetermined speed is slower than said first predetermined speed to decrease the pitch spacing between the web products.

6. The method according to claim 1, including releasing said web products from the speed regulator prior to gradually changing the speed of the speed regulator from the second predetermined constant speed to the first predetermined constant speed.

7. The method according to claim 6, including releasing said web products from the inlet conveyor prior to gradually changing the speed of the speed regulator from the first predetermined constant speed to the second predetermined constant speed.

8. A method for changing the spacing between discrete, flexible web products by directing said web products, in seriatim, and initially at a constant pitch spacing, past an inlet conveyor including at least one gripping surface moving at a first predetermined speed, a speed regulator having at least one gripping surface, and an outlet conveyor including at least one gripping surface moving at a second predetermined speed which is different from said first predetermined speed; said method comprising the steps of:

A. driving the gripping surfaces of said speed regulator through a repeating cycle including, in sequence:
1. a first constant speed period during which the speed of the gripping surfaces of the speed regulator is the same as the first predetermined speed,
2. a first gradually changing speed period,
3. a second constant speed period during which the speed of the gripping surfaces of the speed regulator is the same as the second predetermined speed, and
4. a second gradually changing speed period ending in said first predetermined speed;

B. gripping a first web product by both the gripping surfaces of the inlet conveyor and the gripping surfaces of the speed regulator during only a portion of said first constant speed period;

C. solely controlling the movement of said first web product by the gripping surfaces of the speed regulator during said first changing speed period;

D. gripping said first web product by both the gripping surfaces of the outlet conveyor and the gripping surfaces of the speed regulator during only a part of said second constant speed period;

E. commencing said second changing speed period after said first web product is released by the speed regulator;

F. ending said second changing speed period while movement of the next adjacent web product is solely controlled by the inlet conveyor; and G. repeating steps B through F with said next adjacent web product to thereby change the pitch spacing between adjacent discrete, flexible web products at said outlet conveyor.

9. The method according to claim 8, including gripping opposed major surfaces of the flexible web products by confronting gripping surfaces of said speed regulator.

10. The method according to claim 9, including gripping said flexible web products by the inlet conveyor, the speed regulator and the outlet conveyor adjacent side margins of said web products.

11. The method according to claim 9, wherein said second predetermined speed is faster than said first predetermined speed to increase the pitch spacing between the web products.

12. The method according to claim 9, wherein said second predetermined speed is slower than said first predetermined speed to decrease the pitch spacing between the web products.

13. The method according to claim 8, including gripping said first web product by only the gripping surfaces of the speed regulator during the first changing speed period.

14. The method according to claim 8, including releasing said web products from the speed regulator prior to gradually changing the speed of the speed regulator from the second predetermined constant speed to the first predetermined constant speed.

15. The method according to claim 14, including releasing said web products from the inlet conveyor prior to gradually changing the speed of the speed regulator from the first predetermined constant speed to the second predetermined constant speed.

16. Apparatus for changing the spacing between discrete, flexible web products, said apparatus comprising:
- A. an inlet conveyor for positively gripping said discrete web products and feeding said discrete web products in a downstream direction at a first predetermined speed and at a first constant pitch spacing;
- B. an outlet conveyor downstream from said inlet conveyor for positively gripping said web products and feeding said web products at a second predetermined speed different from said first predetermined speed and at a second constant pitch spacing different from said first constant pitch spacing;
- C. a speed regulator disposed between said inlet and outlet conveyors for transferring said webb products from said inlet conveyor to said webb conveyor, said speed regulator including gripping surfaces and a modulating drive means for driving said moving surfaces through a repeating cycle, each cycle including, in sequence:
  1. a first constant speed period during which the speed of the moving surfaces is the same as the first predetermined speed of said inlet conveyor,
  2. a first gradually changing speed period;
  3. a second constant speed period during which the speed of the moving surfaces is the same as the second predetermined speed of said outelt conveyor; and
  4. a second gradually changing speed period back to said first predetermined speed;

during each cycle one of said web products being engaged by both said inlet conveyor and speed regulator during a portion of said first constant speed period, being solely controlled by said speed regulator during said first gradually changing speed period, being engaged by both said speed regulator and said outlet conveyor during a portion of said second constant speed period and being solely controlled by said outlet conveyor during said second gradually changing speed period, whereby positive control is maintained over each web product as its speed is gradually changed from said first predetermined speed to said second predetermined speed.

17. The apparatus according to claim 16, wherein said speed regulator includes confronting moving surfaces for positively engaging opposed major surfaces of the web product.

18. The apparatus according to claim 17, wherein the gripping surfaces of the inlet conveyor, speed regulator and outlet conveyor are disposed to engage each web product adjacent the machine-direction side margins thereof.

19. The apparatus according to claim 16, wherein said modulating drive means includes an input shaft driven at a first constant velocity, an output shaft for driving the moving surfaces of the speed regulator, a drive-chain connection between said input shaft and output shaft for transferring motion from the input shaft to said output shaft, a cam fixedly secured to said input shaft, a swing frame pivotally mounted on said output shaft, a cam follower secured to said swing frame and engaging said cam, motion transmitting means secured to said swing frame and engaging said drive-chain connection for transmitting the motion of the swing frame to the drive-chain, said cam imparting a varying pattern of motion to said swing frame which is imposed on said drive chain connection through said motion transmitting means for affecting the repeating cycle of the moving surfaces of the speed regulator means.

* * * * *

PO-1050
(5/69)

UNITED STATES PATENT OFFICE
CERTIFICATE OF CORRECTION

Patent No. 3,827,545          Dated August 6, 1974

Inventor(s) Eric S. Buhayar

It is certified that error appears in the above-identified patent and that said Letters Patent are hereby corrected as shown below:

```
Column 3, line 37, add --(-- before "i.e."
Column 3, line 38, add --)--after "flange" and delete ",".
Column 8, line 16, change "direte" to --discrete--.
Column 10, line 5, delete "in".
Column 10, line 6, delete "said first constant speed
                           period (5 to 1)".
Column 10, line 6, should read --d. A gradually decreasing
                           speed period terminating
                           in said first constant speed
                           period (5 to 1)".
Column 11, line 3 of chart, should be --3.55--, not "3    .55".
```

Signed and Sealed this

Fourteenth Day of December 1976

[SEAL]

Attest:

RUTH C. MASON
*Attesting Officer*

C. MARSHALL DANN
*Commissioner of Patents and Trademarks*